Nov. 10, 1936. A. A. KUCHER Re. 20,166

REFRIGERATING MACHINE

Original Filed Oct. 13, 1925 2 Sheets-Sheet 1

WITNESS

A.A. Kucher
INVENTOR

BY

ATTORNEY

Nov. 10, 1936. A. A. KUCHER Re. 20,166

REFRIGERATING MACHINE

Original Filed Oct. 13, 1925 2 Sheets-Sheet 2

WITNESS
O. B. Wakefield

A.A. Kucher
INVENTOR
BY D. C. Davis
ATTORNEY

Reissued Nov. 10, 1936

Re. 20,166

UNITED STATES PATENT OFFICE 20,166

REFRIGERATING MACHINE

Andrew A. Kucher, Dayton, Ohio, assignor to Westinghouse Electric & Manufacturing Company, a corporation of Pennsylvania Original No. 1,798,684, dated March 31, 1931, Serial No. 62,276, October 13, 1925. Application for reissue March 29, 1933, Serial No. 663,409

19 Claims. (Cl. 62—115)

My invention relates to refrigerating machines, particularly to small capacity refrigerating machines of the compression type which are suitable for household use and it has for an object to provide apparatus of the character designated which shall operate reliably, quietly and efficiently. It has for a further object to provide a refrigerating machine which shall be compactly arranged and which shall have its entire compression mechanism hermetically sealed within a unitary structure to prevent escape of the working fluid.

Figure 1:
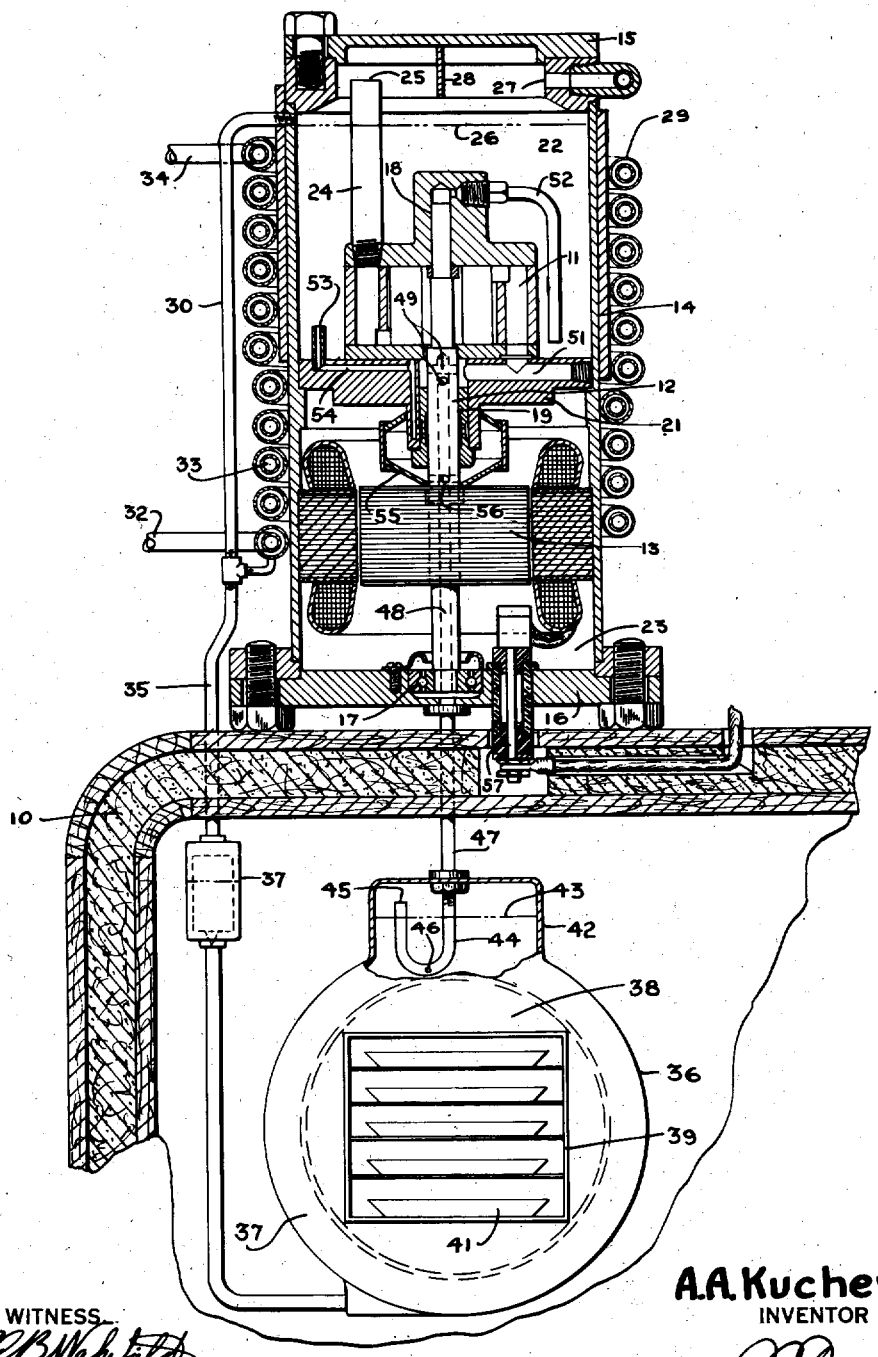
Figure 2:
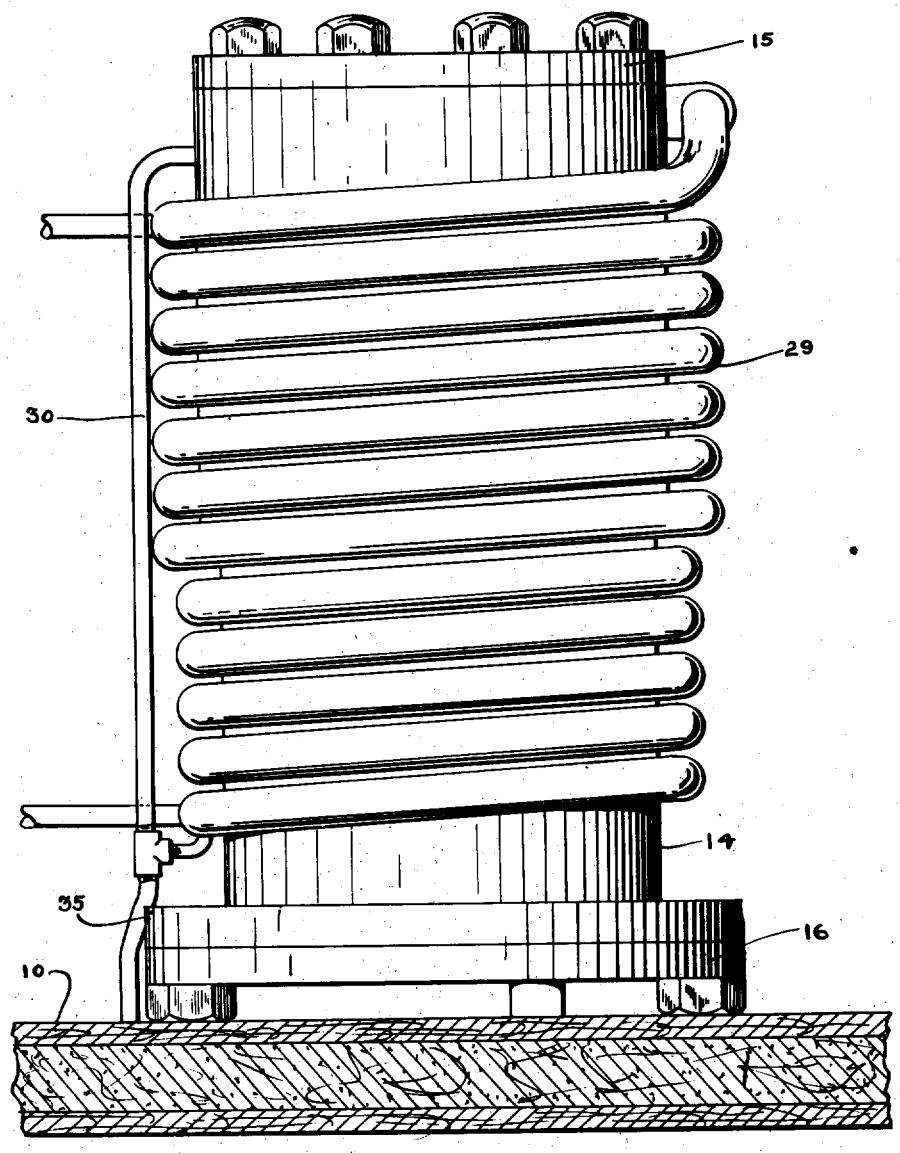

These and other objects, which will be made apparent throughout the further description of my invention, may be attained by the employment of the apparatus hereinafter described and illustrated in the accompanying drawings in which Fig. 1 is a view, partly in section and partly in elevation, of one form of refrigerator arranged in accordance with my invention and Fig. 2 is a partial view, in elevation, of the refrigerator shown in Fig. 1.

Briefly speaking, my invention comprises a refrigerating machine in which the compression mechanism, consisting of a compressor driven by an electric motor, is entirely enclosed within a hermetically sealed chamber. Such an arrangement avoids the necessity of providing a stuffing box for the shaft connecting the motor and the compressor, prevents any escape of the working fluid and effectively muffles any operating noises which may be created by the compressor or the motor. In addition, I locate the condensing element concentrically about the chamber which encloses both the motor and the compressor so that a very compact and symmetrical arrangement of the entire high pressure portion of the machine, that is, the portion generally located outside of the refrigerator box, is provided. Such a form of refrigerating machine occupies a minimum amount of space consistent with its capacity, a very desirable feature in household refrigerating machines. The cooling element or evaporator may be one of many well known forms and may be preferably located in the refrigerator box beneath the compression chamber and directly connected thereto. The above features, together with numerous other features, which will be described hereinafter, cooperate to provide a refrigerating machine well adapted for domestic installation and for effective operation under the exacting requirements of household use.

Referring to the drawings for a more detailed description of my invention, I show, in Fig. 1, a portion of a refrigerator box 10 upon which is mounted the compression and condensing mechanisms with the cooling element located within the box. The compression mechanism comprises a compressor 11 which is directly connected through a shaft 12 to a motor 13 for driving the same. While I have shown a rotary form of compressor, it is to be understood that I may readily employ a compressor of the reciprocating type or any one of numerous other forms of compressors such as are generally employed in refrigerating machines. Furthermore, while I have directly connected the motor to the compressor, which arrangement is the most compact procurable, I may readily provide means for altering the speed of the compressor relative to the motor. Both the motor and the compressor are disposed within a fluid tight compression chamber 14 which is preferably of cylindrical conformation and is provided at its respective ends with removable cover plates 15 and 16.

The shaft 12 is supported at its lower end in a bearing 17 provided in the lower cover plate 16 and is supported at its upper end in a bearing 18 provided in the compressor. An intermediate bearing 19 is provided for the shaft which bearing is carried in a wall member 21 fixed in the compression chamber. This wall member divides the compression chamber into what may be termed a lubricant receptacle 22 and a motor housing 23, the lubricant receptacle containing the compressor and the motor housing the motor.

The compressor discharges through a conduit 24 into the lubricant receptacle 22, the exit end of the conduit being arranged in closely spaced relation with the upper cover plate 15 so that fluid discharged from the compressor is impinged thereon. The exit end 25 of the discharge conduit is preferably located above the level of the lubricating fluid contained in the receptacle, the normal level of the lubricating fluid in the receptacle being indicated at 26. An overflow conduit 30 is provided for the receptacle 22. Provided in the upper portion of the lubricant receptacle is an outlet 27 for the discharge of refrigerant vapor and interposed between the discharge conduit 24 and the outlet 27 is a baffle 28.

The outlet 27 is connected to a condensing coil 29 which is preferably wound about the compression chamber 14 as shown in Fig. 2. The lower portion of the coil communicates with the overflow conduit 30. Cooling water for absorbing the heat of condensation is supplied through an inlet 32 to a water coil 33 which is arranged concentrically within the condensing coil 29, the water being discharged from the coil through an outlet 34. While I have shown a condenser in the form of a coil wound helically about the compression chamber, nevertheless, it is to be understood that I may employ any one of many well known forms of condensers or heat exchanging devices adapted to encircle the compression chamber. Furthermore, while I have shown a condenser which utilizes water as a cooling medium, it is apparent that I may dispense with the water connections and permit air to pass over the condensing coil and absorb the necessary heat of condensation in this way.

The condensing coil 29 is connected to a conduit 35 which passes inside of the refrigerator box and which connects with a cooling element or evaporator 36. Provided in the conduit 35 is a float valve 37 for controlling the flow of liquid therethrough. The evaporator 36 comprises an expansion chamber 37 and a freezing chamber 38 containing some non-congealable liquid such as alcohol and water. Disposed within the freezing chamber 38 is a container 39 for supporting a plurality of molds 41 for forming ice. Superimposed upon the expansion chamber 37 is a surge tank 42 which communicates with the expansion chamber and which contains a level of liquid working fluid such as indicated at 43.

For removing refrigerant fluid from the evaporator, an outlet conduit 44 is provided within the evaporator which conduit has its entrant portion 45 located above the liquid level and is so formed as to have a portion extending below the liquid level. Provided in the outlet conduit 44, at a point below the liquid level 43, is an aperture or small opening 46 for permitting a restricted flow of liquid from the surge tank into the conduit. The outlet conduit 44 of the evaporator is connected through a suction conduit 47 to the compression chamber to which it connects in the vicinity of the lower bearing 17. The fluid is then drawn upwardly through a hollow portion 48 of the shaft 12, the hollow portion 48 communicating through radially disposed holes 49 with a passage 51 connecting with the inlet of the compressor 11.

Lubricant is supplied to the upper bearing 18 and the compressor 11 by means of an inverted tube 52 which connects the upper portion of the bearing 18 with the lower portion of the receptacle 22. The lubricant is supplied to the intermediate bearing 19 by a conduit 53 and a passage 54. Lubricant discharged from the intermediate bearing 19 is collected in a lubricant arrester 55 which is drained through radially disposed holes 56 to the hollow portion 48 of the shaft 12.

Electrical energy is supplied to the motor 13 through fluid tight insulated plugs 57 provided in the lower cover plate 16.

The operation of the above embodiment of my invention is as follows:

Assuming the refrigerating machine to be in operation, the float valve 37 is partially filled, the expansion chamber 37 of the evaporator is completely filled and the receptacle 22 as well as the surge tank 42 are filled to levels such as indicated at 26 and 43 respectively with a body of liquid working fluid. The liquid working fluid which I prefer to employ consists of a refrigerant and a lubricant which together form a physical solution separable only by vaporization and is disclosed in my Patent No. 1,645,198 issued October 11, 1927, and entitled Working fluid for refrigeration.

The action of the compressor 11 maintains a pressure sufficiently low in the expansion chamber 37 of the evaporator to induce vaporization of the liquid working fluid contained therein. In the vaporization process, heat is absorbed from the interior of the refrigerator box 10 and from the non-congealable liquid contained in the freezing chamber 38. As most domestic refrigerating machines operate only intermittently in response to the temperature prevailing within the refrigerator box, an evaporator of the form illustrated possesses numerous advantages. Heat is absorbed from the interior of the refrigerator box directly through the outer walls of the expansion chamber, thus insuring excellent heat conduction. On the other hand, the ice molds 41 are disposed within the freezing chamber 38 which contains a substantial body of non-congealable liquid having a cold storage capacity sufficient to prevent melting of the ice during the idle periods of the machine. In other words, the refrigerator box is cooled by the direct method while ice is formed by the indirect method, thus providing ideal conditions for maintaining the box at a low temperature and for manufacturing and maintaining a maximum quantity of ice.

Because of the aperture 46, which is provided in the outlet conduit 44 within the surge tank, a small quantity of liquid working fluid is entrained in the vapor removed from the expansion chamber 37 by the compressor 11. This refrigerant vapor and commingled liquid pass upwardly through the conduit 47 and enter the compression chamber 14. From the compression chamber 14 the fluid is drawn upwardly through the hollow portion 48 of the shaft 12 and passes out through the radial holes 49 to the passage 51 and thence to the inlet of the compressor 11. In its passage it absorbs a portion of the heat generated by the motor. The refrigerant vapor is discharged from the compressor through the conduit 24 and impinged against the upper cover plate 15. The liquid working fluid, which consists of a refrigerant and a lubricant and which has been entrained in the refrigerant vapor leaving the surge tank 42, materially assists in lubricating and sealing the compressor in passing therethrough. This novel method of entraining a refrigerant and lubricating liquid in the refrigerant vapor passing to the compressor is disclosed in my Patent No. 1,656,917 issued January 24, 1928, for Refrigeration.

As stated heretofore, the refrigerant vapor discharged by the compressor is impinged against the upper cover plate 15 and the entrained liquid falls downwardly into the receptacle 22. The liquid collecting in the receptacle 22 is therefore subjected to the heat generated by the compressor as well as to some of the heat generated by the motor and this heat is utilized to vaporize off the refrigerant component leaving a body of liquid in the receptacle which is substantially a lubricant. Incidentally, the heat generated by the compressor as well as some of the heat generated by the motor is absorbed. This novel method of producing a lubricating fluid and of cooling the compressor and the motor is disclosed in my Patent No. 1,719,807 issued July 2, 1929, for Refrigerator.

The refrigerant vapors discharged through the conduit 24 as well as the vapors generated in the distillation process taking place in the receptacle 22 leave the compression chamber through the outlet 27 and enter the condensing coil 29. Heat is then absorbed by the water which is circulated through the cooling coil 33 and condensation of the refrigerant vapor is thus effected. The condensing coil and the cooling coil are so arranged that the refrigerant vapor dissipates heat both to the surrounding atmosphere as well as to the water in the coil. The cooling water is preferably circulated upwardly through the coil in order to obtain the well known advantages of the contraflow principle. Any excess lubricating fluid which may accumulate in the receptacle 22 overflows through the conduit 30 and commingles with the condensed refrigerant in the conduit 35. This liquid drains downwardly and upon sufficient accumulation thereof in the chamber of the float valve 37, the latter opens to permit the liquid to pass into the expansion chamber 37 of the evaporator 36. Heat is then absorbed from the interior of the refrigerator box and ice is formed in the molds 41 in the manner heretofore described.

Segregation of the lubricating liquid within the expansion chamber 37 is prevented by the constant entrainment of liquid in the aperture 46 so that there is a constant circulation of liquid working fluid, consisting of condensed refrigerant and lubricating liquid, through the expansion chamber. This entrained liquid, in being drawn upwardly to the inlet of the compressor 11, lubricates the lower bearing 17 in its passage besides assisting in lubricating and sealing the compressor in passing therethrough.

Lubrication of the upper bearing 18 is effected by the passage of the lubricating fluid contained in the receptacle 22 through the inverted tube 52. The liquid entering the upper bearing 18 lubricates the same and then drains downwardly into the compressor wherein it assists the entrained liquid passing through the compressor in sealing and lubricating the working parts. Circulation of lubricant through the upper bearing 18 and through the compressor is induced by the difference in pressure prevailing between the receptacle and the interior of the compressor.

Lubrication of the intermediate bearing 19 is effected by the lubricant which drains downwardly through the conduit 53 and passage 54 to the bearing. The lubricant discharged from this bearing is collected in the lubricant arrester 55 from whence it drains through the radially disposed holes 56 to the hollow portion 48 of the shaft 12. Within the hollow portion 48 of the shaft 12 this lubricating liquid, like the liquid which has passed through the aperture 46 in the surge tank, is entrained in the refrigerant vapor passing to the inlet of the compressor and assists in sealing and lubricating the same.

From the foregoing it will be apparent that I have invented a refrigerating machine which is especially adapted for domestic use in that it contains a minimum number of working parts and is very compactly arranged. This compactness is derived by directly connecting the compressor to the motor and by housing both the motor and compressor in a common chamber so that the condensing element may be, what might be termed, wrapped around this chamber. While I have described my form of refrigerator as being preferably water cooled, my apparatus is so arranged that air may be readily utilized to condense the refrigerant vapor.

While I have shown my invention in one form, it will be obvious to those skilled in the art that it is not so limited, but is susceptible of various other changes and modifications, without departing from the spirit thereof, and I desire, therefore, that only such limitations shall be placed thereupon as are imposed by the prior art, or as are specifically set forth in the appended claims.

What I claim is:—

1. In a refrigerator apparatus the combination of an evaporator, a compressor, a motor for driving the compressor, said compressor and said motor being entirely housed within a single hermetically sealed and substantially cylindrical casing, and a condensing coil arranged outside of and concentric with the casing and in physical thermal conducting relation therewith, said coil encompassing the greater portion of the outer surface of the casing.

2. In a refrigerating apparatus, the combination of an evaporator, a compressor, a motor for driving the compressor, a fluid tight casing enclosing both the motor and the compressor, a division wall provided in the casing between the compressor and the motor and forming a single compartment for housing the compressor and for retaining a body of lubricant for the compressor and another compartment for housing the motor, and a condensing element separate from and disposed around the casing.

3. In a refrigerating apparatus, the combination of an evaporator, a compressor, a motor for driving the compressor, and a fluid tight casing entirely enclosing both the compressor and the motor, said fluid tight casing being provided with two separate closures for permitting access to the motor and to the compressor respectively.

4. In a refrigerating apparatus, the combination of an evaporator, a compressor, a motor for driving the compressor, a cylindrical casing entirely enclosing both the motor and the compressor, and a removable fluid tight closure provided in each end of the cylinder for permitting access to the motor and to the compressor, respectively.

5. In a refrigerating apparatus, the combination of an evaporator, a fluid tight enclosing casing, and a compressor and a motor for driving the compressor disposed within the casing, said fluid tight casing being provided with a removable closure for permitting access to the motor and a second and oppositely disposed removable closure for permitting access to the compressor.

6. In a refrigerating apparatus, the combination of an evaporator, a compressor, a motor for driving the compressor, a fluid tight casing enclosing both the compressor and the motor, separate closures provided in the casing for permitting access to the motor and the compressor respectively, and a condenser disposed exteriorly of and around the enclosing casing.

7. In a refrigerating apparatus, the combination of an evaporator, a fluid tight casing, a compressor and a motor for driving the compressor disposed within the casing, said motor embodying rotating and stationary elements and having its stationary element supported directly in the walls of the enclosing casing, whereby the heat generated by the motor is radiated directly through the walls of the enclosing casing, and a condenser located exteriorly of and surrounding the enclosing casing.

8. In a refrigerating apparatus, the combination of an evaporator, a fluid tight casing, a compressor and a motor for driving the compressor disposed within the casing, said enclosing casing embodying removable end closures for permitting access to the motor and to the compressor respectively and said motor embodying rotating and stationary elements and having its stationary element supported directly in the walls of the enclosing casing, whereby the heat generated by the motor is radiated directly through the walls of the enclosing casing, and a condenser located exteriorly of and surrounding the enclosing casing.

9. In a refrigerating apparatus, the combination of an evaporator, a condenser, a compressor, a motor for driving the compressor, and a fluid-tight casing entirely enclosing the motor and the compressor, said casing embodying an intermediate member and removable members secured at opposite sides thereof, one of said removable members being arranged to permit access to the motor and the other of said removable members being arranged to permit access to the compressor.

10. In a refrigerating apparatus, the combination of an evaporating element, a condensing element, a compressor, a motor for driving the compressor, a fluid-tight casing enclosing both the motor and the compressor, said casing having an intermediate member and removable members secured at opposite sides thereof, one of said removable members being arranged to permit access to the motor and the other of said removable members being arranged to permit access to the compressor, and conduit means connected to the intermediate member for providing communication between the compressor and the condensing element.

11. In a refrigerating apparatus, the combination of an evaporating element, a condensing element, a compressor, a motor for driving the compressor, a fluid-tight casing enclosing both the motor and the compressor, said casing having an intermediate member and removable members secured at opposite sides thereof, one of said removable members being arranged to permit access to the motor and the other of said removable members being arranged to permit access to the compressor, and conduit means connected to the intermediate member for providing communication between the casing and the evaporating element.

12. In a refrigerating apparatus, a combination of an evaporating element, a condensing element, a compressor, a motor for driving the compressor, a fluid-tight casing enclosing both the motor and the compressor, said casing having an intermediate member and removable members secured at opposite sides thereof, one of said removable members being arranged to permit access to the motor and the other of said removable members being arranged to permit access to the compressor, and conduit means connected to the intermediate member for providing communication between the casing and the evaporating and condensing elements.

13. In a refrigerating apparatus, the combination of an evaporator, a compressor, a motor for driving the compressor, a fluid-tight casing entirely enclosing both the motor and the compressor, and a condensing element separate from, and disposed around, the casing in physical thermal-conducting relation thereto.

14. In a motor-compressor unit, the combination of a compressor including movable and stationary elements, a motor including a rotor and a stator for driving the compressor, a fluid tight casing enclosing the motor and compressor, said casing embodying a closed partition means intermediate of the casing and extending the entire width thereof for dividing the casing into separate motor and compressor chambers, the motor and compressor being at least partially supported by the partition means in their respective chambers, a drive shaft connecting the rotor of the motor and the movable element of the compressor and extending through the partition means, and removable closure means associated with the casing for permitting access to the rotor and the stator of the motor and to the compressor while disposed in their normal assembled relation.

15. In a motor-compressor unit, the combination of a compressor including movable and stationary elements, a motor including a rotor and a stator for driving the compressor, a fluid tight casing enclosing the motor and compressor, said casing embodying a closed partition means intermediate of the casing and extending the entire width thereof for dividing the casing into separate motor and compressor chambers, the motor and compressor being at least partially supported by the partition means in their respective chambers, a drive shaft connecting the rotor of the motor and the movable element of the compressor and extending through the partition means, and removable closure means associated with the casing for permitting access to the rotor and the stator of the motor while disposed in their normal assembled relation.

16. In refrigerating apparatus, the combination of a compressor, a motor for driving the compressor, a fluid-tight casing enclosing both the motor and compressor and partition means provided interiorly of the casing, extending completely across the casing and forming therewith a compartment for housing the motor and a second and single compartment for both housing the compressor and for storing lubricant, said motor and compressor being on opposite sides of the partition means with the compressor supported entirely by said means, and a drive shaft connecting said motor directly with the compressor and passing through said means whereby the compressor is driven at substantially motor speed.

17. In refrigerating apparatus, the combination of a compressor, a motor for driving the compressor, fluid tight means for enclosing the motor and compressor, a partition extending across and sealed to said means and forming therewith a compartment for housing the motor and a second compartment for housing the compressor, said motor and compressor being on opposite sides of the partition, and a drive shaft connecting said motor to the compressor and passing through said partition, a portion of said means being removable to permit access to said motor and another portion being removable to expose said compressor.

18. In refrigerating apparatus, the combination of a compressor, a motor for driving the compressor, a structural assembly forming a fluid-tight container for enclosing the motor and the compressor, said structural assembly embodying a partition sealed to and extending across the container between the motor and the compressor, said motor and compressor being disposed on opposite sides of the partition, and a drive shaft connecting the motor and compressor and passing through said partition, said structural assembly also embodying a removable portion for affording access to said motor and another removable portion for affording access to said compressor.

19. In a refrigerating apparatus, the combination of a compressor, a motor for driving the compressor, fluid-tight means for enclosing the motor and compressor, a partition sealed to the enclosing means and extending transversely thereof so as to form therewith a compartment for housing the motor and a second compartment for housing the compressor, said motor and compressor being on opposite sides of the partition, and a drive shaft connecting said motor to the compressor and passing through said partition, a portion of said means being removable to permit access to the motor, and another portion being removable to expose said compressor.

ANDREW A. KUCHER.